Patented Aug. 31, 1937

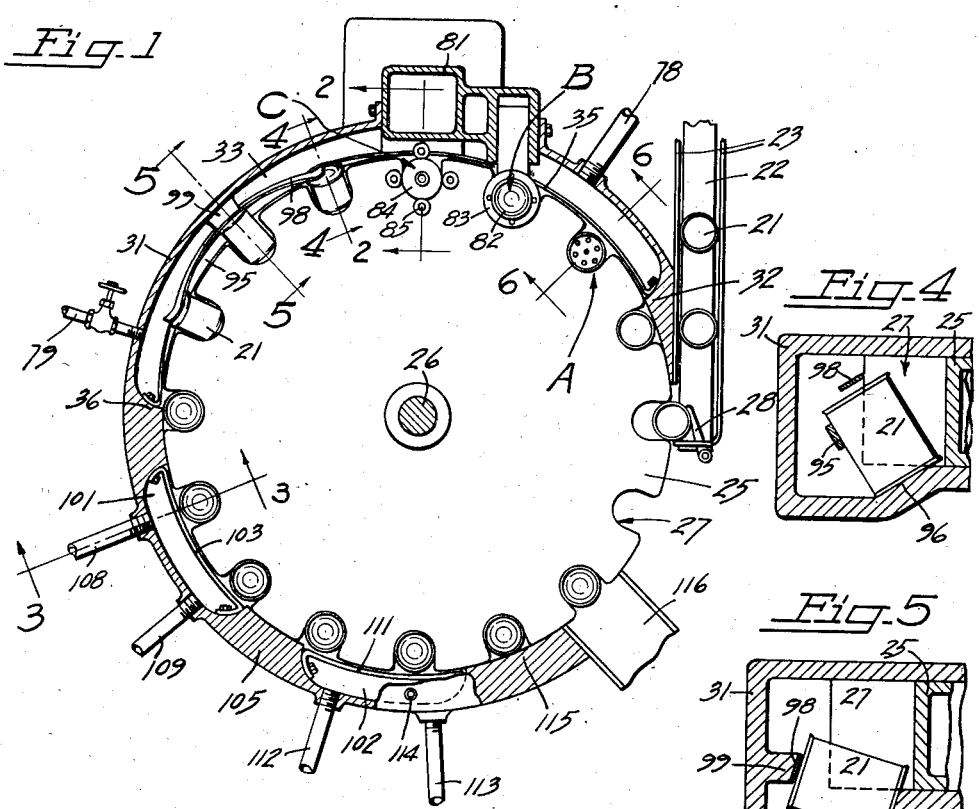
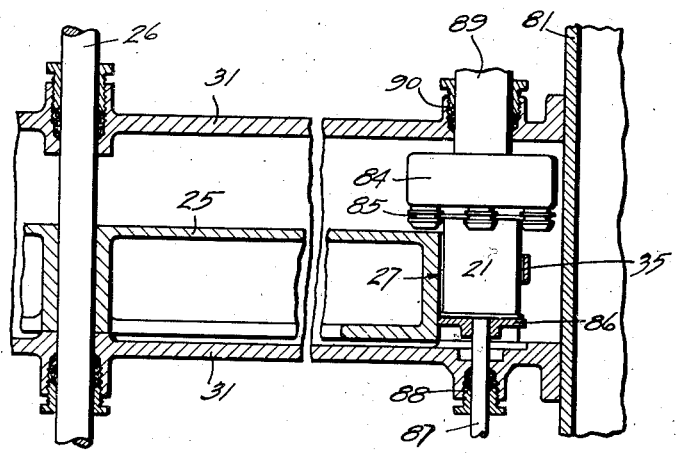
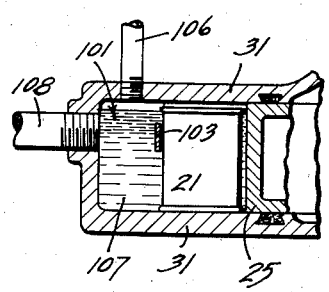

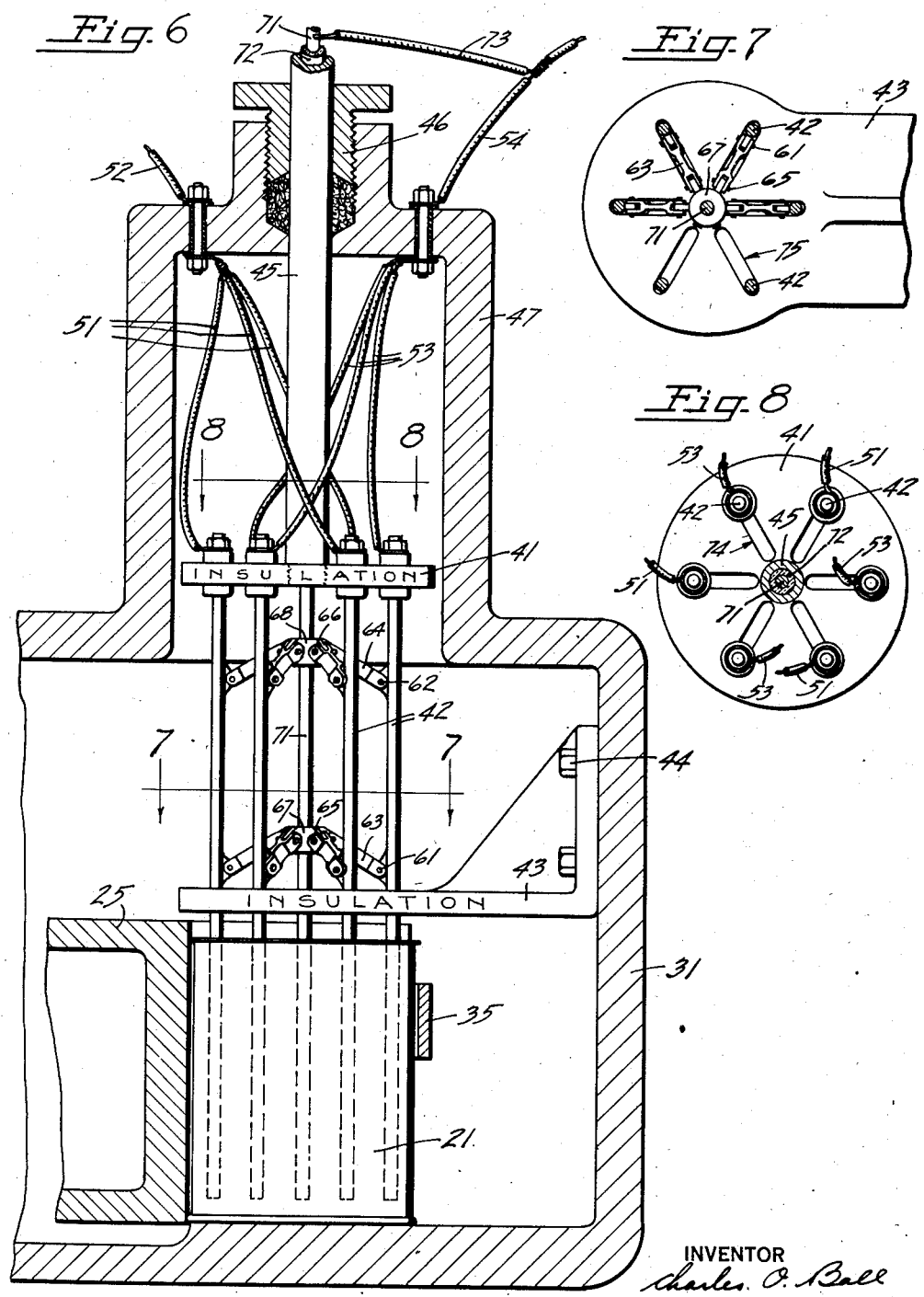

2,091,263

UNITED STATES PATENT OFFICE 2,091,263

APPARATUS FOR AND METHOD OF CANNING

Charles O. Ball, River Forest, Ill., assignor to American Can Company, New York, N. Y., a corporation of New Jersey Application November 19, 1932, Serial No. 643,411

3 Claims. (Cl. 99—253)

The present invention relates in general to an improved method of canning and to apparatus usable in its practice. It has particular reference to the sterilization of a food product by electrical heating in which an electric current is passed through the product mass and between electrodes within the mass so that the resistance of the mass generates heat and raises the temperature sufficiently high to effect sterilization, the heated food being hermetically sealed in a can.

The invention contemplates the introduction of an open top can, filled with a food product, into position for heating, in which position the electrodes of an electric heating current are inserted directly into the product mass. Rapid heating of the product results. This heat is utilized to sterilize the product, the natural flavors and appearance of the product being preserved owing to the relatively short sterilization period and also owing to freedom from any mechanical disturbances.

This manner of sterilization is adaptable for non-acid foods such as vegetables, milk, meat and marine products, or for the acid foods such as fruits, and in either case the process preserves the natural flavors and appearance of the food and permits its final sealing in hermetic containers without impairment of quality.

In canning products of a non-acid nature which require a relatively high sterilizing temperature, the invention contemplates enclosing an open top container or can of food product in a pressure chamber during the raising and maintenance of a sterilization temperature and sealing the product in the can under pressure, thus preventing boiling out of the product when its temperature is being raised and while such temperature remains above the boiling point and before sealing in the can, this heat after sealing in most instances continuing and finally completing the sterilizing action.

The invention has for its principal object the provision of a process or method and apparatus using such a method of sterilizing food products with electrical heating energy in a rapid and continuous manner, the product being sealed in hermetically closed containers and cooled without mechanical disturbances, all of the operations taking place in an uninterrupted and continuous manner.

An important object of the invention is the provision of such a method wherein the sterilization takes place while the product is enclosed in one or more sealed chambers, the sterilized or partially sterilized product being hermetically sealed in a can which is usually cooled prior to being again brought out into the atmosphere the pressure in one chamber offsetting or balancing the internal pressure within the unclosed can caused by the heated product and the pressure in another chamber offsetting or balancing the internal pressure in the closed can after it has been sealed to prevent strain upon the can seams.

An important object of the invention is the provision of such a method wherein the heat of the product after being enclosed in the can is used to effect sterilization of the can cover which provides the sealed closure for the can.

Numerous other objects and advantages of the invention will be apparent as it is better understood from the following description, which, taken in connection with the accompanying drawings, discloses a preferred embodiment thereof.

Referring to the drawings:

Figure 1 is a schematic view illustrating a series of interconnected mechanisms for performing the various steps of the present invention and illustrating in fragmentary form sufficient of the apparatus to carry out these method steps;

Figs. 2, 3, 4 and 5 are enlarged transverse sectional details taken substantially along the respective broken lines 2—2, 3—3, 4—4 and 5—5 in Fig. 1;

Fig. 6 is a greatly enlarged transverse sectional view taken through the heating station as viewed substantially along the section line 6—6 in Fig. 1; and Figs. 7 and 8 are plan sectional details of the heating instrumentalities being taken respectives along the lines 7—7 and 8—8 in Fig. 6.

The invention contemplates the passage of an open top can filled with a suitable material such as a food product into a can carrier which, according to the present embodiment, is formed as a turret or valve having a series of peripheral can receiving pockets. The food which is to be sterilized is conveniently brought into the machine within the can and may be preheated if desired.

In other words, the food as it is first presented to the first step in the present method may have any desired temperature. The consistency or nature of the food will vary, depending entirely upon the product. In some instances the best sterilizing results will be obtained electrically when the interstices of the food are filled with a liquid such as syrup or brine or sauce if the nature of the food is more or less of a solid nature embodying isolated individual pieces.

The filled and open top cans are brought to the can carrier by a conveyor belt, each can being separately introduced into a pocket of the turret. The turret preferably operates intermittently and successively presents each of its can pockets into the various operating stations, a can within a pocket at such time being subjected to the operating units at that station.

The can carrier is largely surrounded by a circular casing and in its walls pressure chambers are enclosed. The casing provides an airtight sliding connection with the can carrier and permits bringing a can into communication with each pressure chamber without interfering with the chamber pressure.

The open top can is first presented to the heating station which is located at one end of the first pressure chamber. As the turret comes into a rest period, it locates the can beneath heating instrumentalities which comprise sets or a series of electrodes in the form of spaced rods carried in a vertically movable head. These rods may conviently be inserted directly into the product mass.

Electric heating energy passes between the different electrode sets or series and a heating current is set up within the product mass as the electric heating energy passes through the product and between electrodes. It is the resistance of the product mass to the flow of this electric current that produces this heating energy. The electric current used for this purpose may be alternating or direct and may have any desired characteristics as to frequency, voltage, etc.

To insure that all of the product mass is uniformly heat treated provision is made for moving the rods radially while in inserted position so that all sections of the product mass may be most efficiently treated.

Pressure is preferably maintained in the enclosed chamber in which the heating station is located and may be created by live steam or by any suitable gas. This pressure is used to counteract and prevent boiling over of the contents when it becomes heated to the sterilizing temperature which may range somewhat between 250° F. and 300° F. A chamber pressure of from 30 to 60 pounds per square inch would be proper for such temperatures.

Non-acid foods are best sterilized by a temperature ranging between 250° F. and 300° F. and under a pressure consistent with such heat. In common practice the acid foods such as fruit are sterilized at a less temperature than the boiling point, approximately 180° F. It has often been found desirable in utilizing the canning procedure of the present invention, even in this class of foods to use a higher temperature and a pressure chamber.

After heating and while the can is still under the chamber pressure, it is presented to any suitable form of cover feed and a cover is placed upon its open end. Such a cover feed is usually embodied in a seaming machine. This cover is hermetically secured to the can by any suitable means, a usual form of double seaming head being illustrated in the drawings as an example of the machine for this purpose.

After sealing the can is preferably subjected to a holding period while still in the pressure chamber, during which time the heat within the product of the can further carries on and completes the sterilization.

While the can cover which has been applied to the can in the seaming machine may be sterilized before it is applied, provision is made for effecting sterilization of its inner surface by means of the heated product. It is convenient to do this during the holding period.

For this purpose provision is made for tilting the can into an inclined or substantially horizontal position and in such position it may be rolled so that the heated product will lay against the inner surface of the cover sufficiently to raise its temperature for sterilizing. This insures completed sterilization not only of the product but of all of the engaged and surrounding surfaces of the can.

The can carrier then removes the sealed and sterilized can from the first pressure chamber and presents it to a cooling chamber through which cooling medium of any suitable character may be circulated. This chamber is also preferably maintained under pressure to counteract the internal pressure of the heated product contained within the sealed can so that strains upon the can seams will be relieved.

In the drawings a water cooling system is illustrated to provide the proper cooling. It is not necessary to complete the cooling in a chamber under pressure and accordingly two cooling chambers are shown. The second chamber may be under atmospheric pressure or at only a slightly greater pressure, depending upon the degree of heat still in the can after leaving the first cooling chamber. During the passage of the cans through the cooling chambers its temperature is reduced to a practical point, after which it is discharged from the machine.

All of the operations taking place upon the can are produced by the proper instrumentalities associated at the various stations arranged around the periphery of the can carrier so that the can is successively passed to and through each operating device and the steps of the method are thus carried out in a continuous and unbroken automatic manner. Automatic control of steam, air and water is a part of these operations, it being only necessary to pass the can through the operating stations in order to obtain the desired results.

For the purpose of more clearly illustrating the various steps of the present invention the drawings show sufficient parts of a mechanism or a series of mechanisms for treating the product. Cans 21 (Fig. 1) filled with a food product may be brought into the apparatus on an endless belt conveyor 22 and guided between guide rails 23.

A turret form of can carrier or conveyor 25 is secured to a vertical shaft 26 and provides the conveying mechanism for the can. This turret is formed with peripheral, spaced, can receiving pockets 27 into which a can 21 is transferred from the belt 22 by an oscillating arm 28.

A housing 31 partially surrounds and substantially encloses the turret 25 and presents a floor over which the can is slid. A wall 32 of the housing provides a seal for the turret pocket as it moves past the wall. An elongated pressure chamber 33 is formed in the housing 31 and extends outside of and along the periphery of the turret 25, one end of the chamber extending to the wall 32.

The turret 25 is intermittently moved and during its stop period presents a pocket 27 to the feeding arm 28. After receiving a can it moves to the next position and the can is then brought adjacent the wall 32. Following a rest period the can is next brought to the heating station (indicated by the letter A, Fig. 1) which is located in one end of the chamber 33.

At such a time and throughout a number of succeeding step movements of the turret, the can is held within its pocket by a circular guide rail 35 located in the chamber 33, one end being fastened to the wall part 32 and the opposite end to a wall part 36 located at the opposite end of the chamber. This guide rail 35 is bent throughout a part of its length for a purpose hereinafter described.

It is during the rest period of the can 21 at station A that the product within the can is heated to sterilizing temperature. The can is located beneath a head 41 (Figs. 6 and 8) which carries a series of radially disposed vertically extending rods 42. The head 41 is formed of a suitable insulating material and the rods 42 extend downwardly through an insulating bracket 43 bolted at 44 to the housing 31.

This head and all parts associated therewith are incorporated within the chamber 33. The head 41 is mounted upon a vertically disposed sleeve 45 which passes through a stuffing box 46 located in a head casing 47 formed in the housing 31. The head 41 is lowered in any suitable manner by a lowering of the sleeve 45 and the rods 42 are then inserted within the product mass within the can 21, this position being illustrated in Fig. 6.

Alternate rods 42 are used in one group or set of electrodes which are electrically connected by wires 51 to one side 52 of any suitable electrical circuit. The other rods 42 are similarly connected by wires 53 to the opposite side 54 of the circuit. Electrical energy is caused to flow through the circuit wires 52, 54 and the current flows through the product mass and between the two sets or series of electrodes. The resistance (electrically speaking) of the mass of the product produces the heat for sterilizing.

To insure a more complete heat distribution in the entire product mass provision is made for moving the rods 42 closer toward the center of the can while the electrical energy continues to pass between opposed electrode series. For this purpose each rod is pivotally connected at 61 and 62 (Figs. 6 and 7) to lower and upper links 63, 64 pivoted at 65, 66 to center collars 67, 68. Each collar is formed of insulating material to prevent shorting of the current between connected electrodes.

Each collar 67, 68 is secured to a central rod 71 which passes through an insulated sleeve 72 located inside of the sleeve 45. This rod 71 is suitably joined with the wire 54 by a wire 73 and by means of the electrical connection thus made the rod 71 functions as an electrode along with the other electrodes. It is raised in any suitable manner. As it is lifted the links 63, 64 shift position and the radially disposed rods 42 are moved closer toward the center of the can. Rarial slots 74, 75 (Figs. 7 and 8) are cut through the insulated bracket 43 and the head 41 to afford clearance for the rods during such movement.

A variation in the construction of the head 41 may be used where the can 21 is of plain tin, that is not enameled or otherwise lined on its interior, by utilizing the can wall as one electrode for one side of the current and using a single electrode or a number of electrodes of the same series inserted into the product within the can for the other side of the current. In this case the can will be grounded to one side of the circuit and the electrodes within the can would be on the other side. This could easily be accomplished by connecting the single or the multiple inner electrodes with the wire 54 and grounding the wall of the housing 31 by connection with the wire 52.

Where the sterilizing temperature used in this operation is in excess of the boiling point the chamber 33 is maintained under a pressure in excess of atmospheric pressure. A pipe 78 (Fig. 1) leading into the chamber may be used for the introduction of live steam or suitable gas for this purpose. A vent pipe 79 also leading into the chamber is used, its opening being controlled by a valve 80. This latter pipe is used in starting the steam pressure in the chamber and after the chamber is filled with steam the valve 80 is used as a bleed valve for more easily maintaining a live steam atmosphere. Steam is usually preferred as it has the advantage of assisting in raising and in holding the higher temperature of can and product.

The housing 31 is formed to permit employment of a double seaming apparatus indicated generally by the numeral 81. This may be of any usual and well known type and is preferably provided with means for presenting a can cover 82 to the open top of the can as it is moved by the turret 25 into the next position, this being indicated in Fig. 1 as station B. After the product has been heated by the electrodes just described the turret 25 moves the heated can into station B. The can covers 82 are retained in a magazine or stack 83 and a single cover is presented to the open top heated can beneath.

At the next step movement of the turret 25 the can is presened to the double seaming rolls of a seaming mechanism, these being located at a station C (Fig. 1). The double seaming mechanism is of any suitable type, a conventional seaming head 84 carrying seaming rollers 85, being illustrated in Figs. 1 and 2. The can 21 at this station is raised by a plunger 86 carried on a shaft 87 passing through a stuffing box 88 formed in the housing 31. The seaming head 84 is associated with a shaft member 89 extending through a stuffing box 90 located in the housing 31.

The seaming head 84 as well as the cover magazine 83 are located within the pressure chamber 33. The can with its heated product remains under the pressure of the chamber 33 while it is hermetically sealed and any boiling over of its contents is thus prevented and there is no mechanical disturbance to injure the texture of the product or to affect its desirable characteristics.

The hermetically sealed can with its partially sterilized product is then conveyed in a series of step movements through a holding period, during which time it is still in the chamber 33 and the relatively high heat in the product of the can continues and completes the sterilization. It is during the holding period that the can is shifted from its upright position in the pocket 27 of the turret 25 and is brought into an inclined or nearly horizontal position. In this position it is rolled for a short distance in order that the heated product in the can will heat the newly applied can cover which will be thoroughly sterilized.

To perform the tilting operation the guide rail 35 is bowed outwardly and downwardly at 95 (Figs. 1, 4 and 5) to form a progressively curved support for lowering the can into tilted position and for again righting it into vertical upright position. During this movement of the can through the chamber 33, it passes along over the wall of the housing 31 and as it meets the bowed section 95 of the guide rail 35, the floor of the housing tips downwardly in an inclined surface 96 (Fig. 4).

The can riding on this surface rocks from its vertical position and falls first into the position illustrated in Fig. 4, at which time it is partially supported by the section 95 of the guide rail. This inclined floor 96 merges into a steeper floor section 97 (Fig. 5) and at the same time the supporting rail 95 bends down into a lower position to accommodate the change in position of the can. In Fig. 5 the can is shown fully tilted and its contents lays against the inside wall of the cover. The heat of the product thus partially passes into the cover raising its temperature to a sterilizing degree.

A support rail 98 (Figs. 1, 4 and 5) is provided as a retaining guide plate for the top part of the can and assists in holding it during tilting and righting. This rail 98 is shaped to correspond with the different positions of the can and is secured to a bracket 99 formed in the wall of the housing 31.

As the carrier 25 further advances the can through the chamber 33 it is gradually raised from its inclined position by a reversal of its tilting movement and is eventually restored to upright position within the turret pocket.

As the can passes opposite the wall 36 of the housing 31 it is cut off from communication with the pressure chamber 33 and is then brought into the first of a pair of cooling chambers 101, 102. A circular guide rail 103 is located in chamber 101 and retains the cans within the turret pocket during passage of the turret through the chamber. The rail 103 is fixed at one end to the wall 36 of the housing and at its opposite end to a wall 105 formed in the housing. The wall 105 closes off the chamber 101.

The chamber 101 is preferably also carried under pressure, such a pressure preventing the internal pressure of the can's heated contents from straining the seams of the can. During the passage of the can through the chamber it is cooled to any desired point.

The pressure in chamber 101 may be maintained by means of compressed air introduced into the top of the chamber through a pipe 106 (Fig. 3). A suitable cooling medium is also supplied to the cooling chamber 101, there being illustrated for this purpose a water bath 107. Water circulation for the bath is maintained by means of pipes 108, 109 extending through the housing wall. The can is subjected to the water bath 107 and its contents is accordingly cooled.

As the can is moved into position adjacent the wall 105 of the housing 31 it is cut off from the chamber 101 and further movement places it into the second cooling chamber 102. This chamber is identical in construction to the cooling chamber 101 although a less pressure is maintained in the chamber. In some cases no pressure at all is necessary.

The can during passage through the chamber 102 is held in its turret pocket by a guide rail 111 secured to the walls of the housing 31. A circulation of water is maintained in the chamber 102 by means of pipes 112, 113 extending through the wall of the chamber. When a pressure is used in the chamber it may be obtained by compressed air introduced through a pipe 114 passing through the top wall of the chamber.

The chamber 102 is confined at one end by a wall 115 and further movement of the turret brings the cooled can adjacent this wall, at which time the can is cut off from the chamber 102. Subsequent movement of the turret 25 then carries the can over a discharge chute 116 into which it falls and passes out of the apparatus.

It is thought that the invention and many of its attendant advantages will be understood from the foregoing description, and it will be apparent that various changes may be made in the form, construction, and arrangement of parts of the apparatus mentioned herein and in the steps and their order of accomplishment of the process described herein, without departing from the spirit and scope of the invention or sacrificing all of its material advantages, the apparatus and process hereinbefore described being merely a preferred embodiment thereof.

I claim:

1. An apparatus for canning which comprises a sealed chamber, a can carrier for introducing an open top can containing a product into said chamber, means for placing said chamber under pressure in excess of atmospheric pressure, electrodes for carrying an electric heating current, devices for inserting said electrodes into the product in said can, means for passing a heating current through said electrodes and through the product intervening so that the latter is heated to sterilizing temperature, means for shifting said electrodes within said can and transversely of said product to completely permeate the product with sterilizing heat, means for sealing said heated product in said can while still under pressure in said chamber, and means for changing the position of said can while still in said chamber to more completely sterilize the inner walls of the can as well as its contents.

2. An apparatus for canning which comprises a plurality of sealed chambers, a can carrier for introducing an open top can containing a product into said chambers, means for placing said chambers under pressure in excess of atmospheric pressure, electrodes located in one of said chambers for carrying an electric heating current, devices for inserting said electrodes into the product in said can, means for passing said heating current through said electrodes and through the product intervening, devices for shifting said electrodes in the product relative to the longitudinal axis of the can so that the product is sufficiently and uniformly heated to sterilizing temperature, means for sealing said sterilized product in said can while still under pressure in said heating chamber, and cooling means associated with other chambers for cooling the said sterilized can when it is carried through said cooling chambers by said can carrier.

3. A method of canning which comprises passing an open top can containing a product into a sealed chamber and maintaining a pressure in said chamber, inserting electrodes into the product, passing electric heating energy between said electrodes and through the product so that it is heated to sterilizing temperature, moving said electrodes while in said product in a direction relative to the longitudinal axis of the can and transversely of said product to thoroughly permeate the product with sterilizing heat, the pressure developed in the product by the sterilizing heat being balanced by the pressure in said chamber so that boiling of the product is prevented, supplying said heated can with a cover, hermetically sealing said can by application of said cover, and holding the sealed can under the pressure of said chamber to complete its sterilization.

CHARLES O. BALL.